United States Patent [19]

Moskovich et al.

[11] 4,047,222

[45] Sept. 6, 1977

[54] CAMERA VIEWFINDING SYSTEM

[75] Inventors: Jacob Moskovich, Hollywood; Gary E. Wiese, Canoga Park; Richard M. Altman, Woodland Hills; Thomas D. McLaughlin, Thousand Oaks, all of Calif.

[73] Assignee: Optigon Research & Development Corporation, Santa Monica, Calif.

[21] Appl. No.: 648,780

[22] Filed: Jan. 13, 1976

[51] Int. Cl.² ............... G03B 13/06; G03B 19/12
[52] U.S. Cl. .................................. 354/155; 354/225
[58] Field of Search ............. 354/152, 155, 224, 225; 350/286, 48, 49, 50, 51, 52, 53

[56] References Cited

U.S. PATENT DOCUMENTS 3,601,477  8/1971  Miyazaki ..................... 354/155 X

FOREIGN PATENT DOCUMENTS 1,108,066  5/1961  Germany ..................... 354/152

Primary Examiner—Edna M. O'Connor
Attorney, Agent, or Firm—DeLio and Montgomery

[57] ABSTRACT

A viewfinder system for a through-the-lens viewing camera which includes a focusing screen, a field lens, a prism, and an eyepiece is disclosed where the field lens is positionable in accordance with the position of the exit pupil of the objective lens and the eyepiece is positioned in accordance with the position of the field lens. Negative optical power is introduced between the field lens and the prism, and the prism design substantially reduces the size of the prism without sacrificing viewfinder brightness.

12 Claims, 4 Drawing Figures

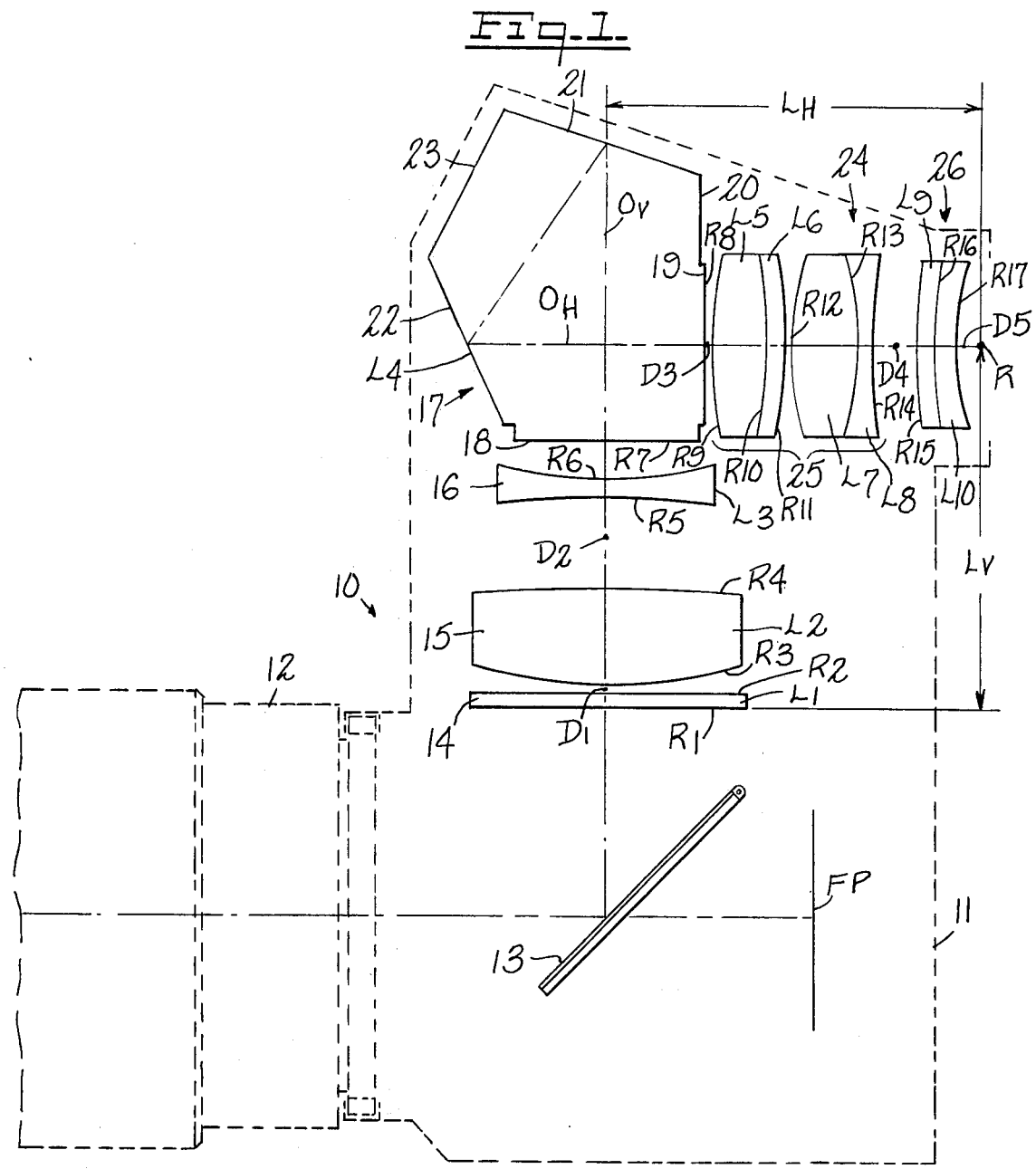

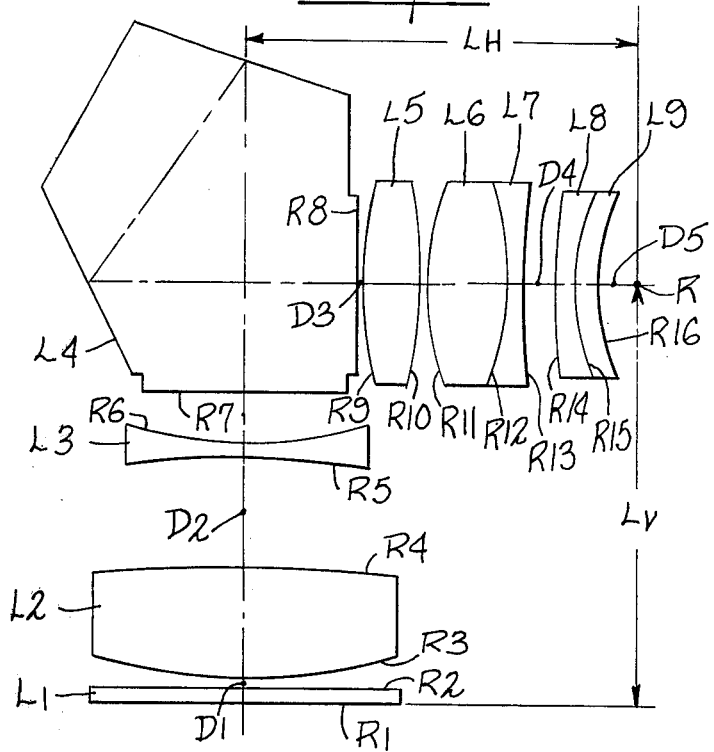
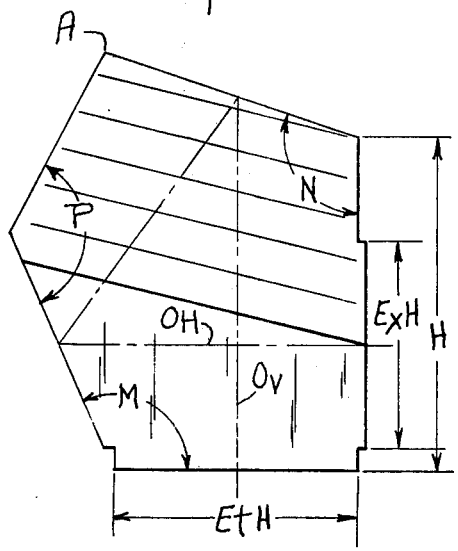
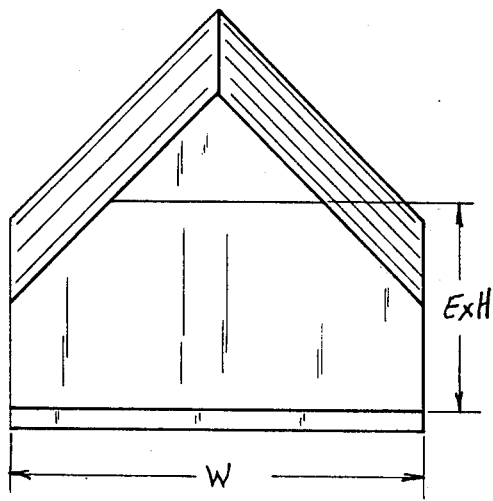

CAMERA VIEWFINDING SYSTEM

This invention relates to camera viewfinding systems, and more particularly relates to viewing systems of reflux cameras utilizing a prism and adapted to accept interchangeable lenses.

Single lens reflux cameras have a viewfinding system which includes a mirror pivotally mounted behind the lens, a focusing screen, a field lens, a prism, and an eyepiece to present an image of an object to the viewer.

The viewing system of a single lens reflux camera is basically designed for the original lens supplied with the camera, i.e., a lens of about 50mm - 58mm focal length. More specifically, the viewing system is designed in accordance with the location of the exit pupil of the standard lens. When other lenses having different exit pupil locations are used with the camera, the brightness of an image on the focusing screen is diminished, particularly around the edges.

To compensate for this change in lens exit pupil location and resultant change in viewfinder image brightness, and uniformity of brightness, some camera manufacturers design their cameras for interchangeable focusing screens, or a combination of focusing screen and field lens.

Besides the expense of these interchangeable screens and/or field lens-screen combination, the changing of these devices is time-consuming, and the serious photographer is burdened with yet more equipment to carry and manage.

Application Ser. No. 648,779 filed on the same date as this application discloses and claims a new and improved viewing system for a reflex camera which may be adjusted to compensate for location of the lens exit pupil, and which requires no interchangeable screens or field lenses. In such system the viewfinder system field lens is positionable in accordance with the position of the objective lens exit pupil and the eyepiece lens is positionable in accordance with the position of the field lens to maintain uniform viewing field brightness without changing magnification of the field.

The present invention is directed to certain improvements in the system of said copending application.

Briefly stated, the present invention provides an improved exit pupil location compensating viewfinder system having optical qualities which minimize the size of the viewfinder prism and permit motion of the field and eyepiece lenses with no substantial increase in camera body dimension. The invention further provides a prism of decreased size without sacrifice in viewing brightness. A negative power lens is in fixed position between the field lens and entrance face of the prism to permit decrease in prism entrance face. The prism is contoured to maintain the necessary optical path length and the exit window of the prism is made large in comparison with the entrance window to maximize brightness. The invention further permits the movement of the eyepiece lens to be made linear with movement of the field lens.

An object of this invention is to provide a new and improved viewing system for a single lens reflex camera using a prism of decreased size without sacrificing viewing brightness, Another object of this invention is to provide a viewing system for a single lens reflex camera in which new and improved optical elements of the system permit positioning of the field lens and eyepiece in accordance with the location of the exit pupil of the lens used with the camera with no substantial increase in size of the camera.

A further object of this invention is to provide a viewing system for a single lens reflex camera in which the field lens is positionable in accordance with the exit pupil location of the lens, and where the eyepiece elements are positioned with the field lens to avoid a change in magnification of the viewed object, in which the size of the prism is reduced and the positioning motions are permitted within the camera.

The features of the invention which are believed to be novel are particularly pointed out and distinctly claimed in the concluding portion of this specification. However, the invention together with further objects and advantages thereof may best be appreciated by reference to the following detailed description taken in conjunction with the drawings, wherein:

FIG. 1 is a side elevation of one viewfinding system for a single lens reflex camera embodying the invention, as shown in a camera;

FIGS. 2 and 3 are side and back views of a prism utilized in the invention; and

FIG. 4 is a side elevation of another viewfinding system for a single lens reflex camera embodying the invention.

A camera 10 having a body 11, a detachable objective lens 12, and the conventional pivotal mirror 13 is shown in FIG. 1. Mirror 13 reflects light to a viewfinder system.

The viewfinder system comprises a focusing screen 14, a field lens 15, a negative power lens 16, a prism 17 having an entrance surface 18 on its lower surface, an exit surface 19 defined from rear surface 20, and reflecting surfaces 21 and 22 joined by surface 23. Disposed behind exit surface 19 is an eyepiece 24 comprising lens groups 25 and 26. The surfaces 18 and 19 define the entrance and exit apertures, respectively, of the prism.

The optical elements of the viewfinder are also indicated by the elements L1-L10 and surfaces R1-R17 for purposes of later specific disclosure.

Field lens 15 is movable between screen 14 and lens 16 to compensate for change in exit pupil location of the objective lens. Lens group 25 moves in response to movement of field lens 15 to avoid magnification change of the object, and lens group 26 moves slightly to maintain focus. Such movements to change the location of lenses 15, 25 and 26 may be in response to a coding device on the objective lens, or may be accomplished manually as shown in copending application Ser. No. 648779 filed on the same date as this application.

The vertical optical axis in the prism is $O_V$ and the horizontal optical axis is $O_H$, (FIG. 2) which coincide with the optical axis of the other lenses and the overall viewfinding system. R is a reference point behind eyepiece 24. $L_H$ is the distance from $O_V$ to R, and $L_V$ is the distance from $O_H$ to the front surface of screen 14. The distances D1-D5 are variable as hereinafter pointed out in Tables II and IV.

The optical characteristics of the viewfinder system of FIG. 1 may be defined substantially as follows in Table I.

TABLE I

| Lens | Surface Radius (mm) | Axial Distance Between Surfaces (mm) | $N_d$ | $V_d$ |
|---|---|---|---|---|
| L1 | R1  27.26 (Fresnel) | 1.50 | 1.586 | 29.9 |

TABLE I-continued

| Lens | | Surface Radius (mm) | Axial Distance Between Surfaces (mm) | $N_d$ | $V_d$ |
|---|---|---|---|---|---|
| | R2 | plano | | | |
| | | | 0.50 | | |
| L2 | R3 | 41.33 | | 1.713 | 53.9 |
| | R4 | −274.99 | 8.45 | | |
| | | | 8.50 | | |
| L3 | R5 | −89.18 | | 1.805 | 25.5 |
| | R6 | 37.78 | 1.50 | | |
| | | | 3.55 | | |
| L4 | R7 | plano | | 1.717 | 29.5 |
| | R8 | plano | 72.00 | | |
| | | | 0.50 | | |
| L5 | R9 | 44.77 | | 1.517 | 64.2 |
| | R10 | −57.47 | 4.90 | | |
| L6 | R11 | −51.01 | 2.00 | 1.517 | 64.2 |
| | | | 0.50 | | |
| L7 | R12 | 25.61 | | 1.620 | 60.3 |
| | R13 | −31.24 | 5.88 | | |
| L8 | R14 | 65.34 | 1.50 | 1.744 | 44.9 |
| | | | 4.12 | | |
| L9 | R15 | 82.49 | | 1.589 | 61.3 |
| | R16 | 61.50 | 1.50 | | |
| L10 | R17 | 18.94 | 2.00 | 1.487 | 70.4 |

Where $N_d$ and $V_d$ is the index of refraction and Abbe number as referred to the d-line of sodium.
Clear Apertures
L1  24 × 36 mm
R7  17.8 × 29.0 mm
R8  14.6 × 29.0 mm
Equivalent Focal Lengths
L2  50.965 mm
L3  −32.785 mm The position of the lens 15, 25 and 26 with respect to objective exit pupil location is given in Table II.

TABLE II

| Exit Pupil to Front of Focusing Screen (mm) | D1 (mm) | D2 (mm) | D3 (mm) | D4 (mm) | D5 (mm) |
|---|---|---|---|---|---|
| 48.0 | 0.500 | 8.500 | 0.500 | 4.124 | 1.089 |
| 57.0 | 2.300 | 6.700 | 1.039 | 3.262 | 1.412 |
| 68.0 | 4.100 | 4.900 | 1.578 | 2.399 | 1.736 |
| 84.5 | 5.900 | 3.100 | 2.117 | 1.536 | 2.060 |
| 105.0 | 7.700 | 1.300 | 2.656 | 0.674 | 2.383 |

Where D1 is the distance between focusing screen 14 and field lens 15,
D2 is the distance between field lens 15 and negative lens 16,
D3 is the distance between the exit surface 19 of the prism and the lens group 25,
D4 is the distance between lens group 25 and lens group 26, and
D5 is the distance between lens group 26 and reference point R, all measured on the optical axis of the system. $L_H$ = 33.40 mm $L_V$ = 32.79 mm Another embodiment of the invention may be defined substantially by the data of Table III with reference to

TABLE III

| Lens | | Surface Radius (mm) | Axial Distance Between Surfaces (mm) | $N_d$ | $V_d$ |
|---|---|---|---|---|---|
| L1 | R1 | 28.48 (Fresnel) | 1.50 | 1.586 | 29.9 |
| | R2 | plano | 0.50 | | |
| L2 | R3 | 41.66 | 8.69 | 1.713 | 53.9 |
| | R4 | −208.96 | 8.50 | | |
| L3 | R5 | −76.24 | 1.50 | 1.805 | 25.5 |
| | R6 | 41.33 | 3.22 | | |
| L4 | R7 | plano | 72.00 | 1.717 | 29.5 |
| | R8 | plano | 0.50 | | |
| L5 | R9 | 43.62 | 7.60 | 1.517 | 64.2 |
| L6 | R10 | −71.25 | 3.80 | 1.517 | 64.2 |
| | R11 | −52.00 | 0.50 | | |
| L7 | R12 | 25.26 | 5.98 | 1.620 | 60.3 |
| | R13 | −30.59 | | | |
| L8 | R14 | 64.41 | 1.50 | 1.744 | 44.9 |
| | | | 4.06 | | |
| L9 | R15 | 116.69 | 1.50 | 1.589 | 61.3 |
| L10 | R16 | 111.29 | 2.00 | 1.487 | 70.4 |
| | R17 | 19.41 | | | |

Where $N_d$ and $V_d$ is the index of refraction and Abbe number as referred to the d-line of sodium.
Clear Apertures
L1  24 × 36 mm
R7  17.8 × 29.0 mm
R8  14.6 × 29.0 mm
Equivalent Focal Lengths
L2  49.43 mm
L3  −33.10 mm The locations of the lens 15, 25 and 26 with respect to objective lens exit pupil location is given in Table IV.

TABLE IV

| Exit Pupil to Front of Focusing Screen (mm) | D1 (mm) | D2 (mm) | D3 (mm) | D4 (mm) | D5 (mm) |
|---|---|---|---|---|---|
| 48.0 | 0.500 | 8.500 | 0.500 | 4.055 | 1.061 |
| 56.5 | 2.300 | 6.700 | 1.084 | 3.183 | 1.349 |
| 68.5 | 4.100 | 4.900 | 1.669 | 2.311 | 1.636 |
| 85.5 | 5.900 | 3.100 | 2.253 | 1.439 | 1.924 |
| 107.0 | 7.700 | 1.300 | 2.838 | 0.566 | 2.212 |

$L_H$ = 37.90 mm
$L_V$ = 32.70 mm

Where D1 is the distance between focusing screen 14 and field lens 15,
D2 is the distance between field lens 15 and negative lens 16,
D3 is the distance between the exit surface 19 of the prism and the lens group 25,
D4 is the distance between lens group 25 and lens group 26, and
D5 is the distance between lens group 26 and reference point R, all measured on the optical axis of the system.

The point of curvature of surfaces R10 of the system of Table III is on a line extending about eleven degrees upwardly from the axis $O_H$ and in a vertical to ef-

FIG. 1.

fecitvely tip surfaces R10, for purposes described in copending application Ser. No. 648779 filed on the same day as this application.

In both of the embodiments disclosed thus far the motions of the eyepiece groups 25 and 26 are toward each other (D4 decreases) as field lens 15 is positioned upwardly.

The movements of the elements described permit the field lens to correctly image the exit pupil of the objective lens, without change in magnification and while maintaining focus in the viewing system. Otherwise stated, the entrance pupil of the viewfinder is made to coincide with the exit pupil of the objective lens.

The numerical examples set forth above and later herein are the data for a single lens reflux camera having a 24×36mm image frame. It is apparent that the parameters set forth could be scaled to an image frame of different format.

FIGS. 2 and 3 show prism 17 is more detail. It has the general outline of most roof type pentaprisms but is considerably smaller. The angle of the roof of the upper reflecting surfaces 20 is the usual 90°. The sum of the angles M and N is the usual 225°.

| | |
|---|---|
| EtH | is the height of the entrance surface |
| ExH | is the height of the exit surface |
| W | is the width of the prism |
| $O_V$ | is the length of the optical axis of the system in the vertical in the prism. |
| $O_H$ | is the length of the optical axis of the system in the horizontal in the prism. |

The actual values of the foregoing quantities in the prisms of Tables I, III and V are EtH = 17.8mm
ExH = 14.6mm
W = 29.0mm
$O_V$ = 27.16mm
$O_H$ = 22.86mm
M = 117° 24'
N = 107° 36'
P = 122° 40'

To provide this prism certain unique relationships exist.

$O_V/O_H > 1$

ExH/EtH ≦ 0.70

W < major dimension of image frame

Additionally,
$1.2 \geq L_H/L_V \geq 0.9$ $\left|\dfrac{EFL \text{ of } L2}{EFL \text{ of } L3}\right| \approx 1.5$ A comparison of the prism 17 with the conventional prism of a single lens reflux camera is as follows:

| | Prism 17 (L4) | Conventional |
|---|---|---|
| Optical Axis | 72.00 mm | about 82 mm |
| Entrance Surface (Clear Aperture) | 17.8 × 29.00 mm | 24 × 36 mm (approximate) |
| Exit Surface (Clear Aperture) | 14.6 × 29.00 mm | 10 × 36 mm (approximate) |
| Ratio of Exit to Entrance Surface Area | .74 | .30 (approximate) |
| Ratio of Vertical to Horizontal Optical Axis in Prism ($O_V/O_H$) | 1.189 | less than 1.0 |
| Ratio of Heights of Exit to Entrance Sufaces (ExH/EtH) | .820 | .416 (approximate) |
| Height of Rear Surface (H) | 24.18 mm | 21 mm (approximate) |
| Ratio of Height of Rear Surface to Height of Entrance Surface (H/EtH) | 1.36 | less than 1.0 |
| Index of Refraction | 1.7+ | 1.517 |

The data listed under the heading "Conventional" is typical but may vary slightly with different camera manufacturers.

The height of the rear prism surface H in the present invention is always greater than the height of the entrance surfaces. As a result, the length of the optical axis in the vertical $O_V$, is greater than that in the horizontal $O_H$ within the prism.

Another unique feature of the prism is that the apex A resides forwardly of the entrance surface 18 of prism 17.

The reduction in the area of the entrance surface of the prism (516mm² vs. 864mm²) to an area sixty percent of conventional is enabled by the provision of the negative lens between the entrance surface of the prism and the field lens. This lens is preferably made bi-concave to share the negative power on both surfaces and reduce undesired aberrations.

The importance of the configuration of a prism embodying the invention is shown by the fact that if the ratio of exit surface height to entrance surface height was reduced to 0.74, seventy percent of the upper half of the bundle at the focusing screen would not be seen in the viewfinder. This would result in a top screen brightness to center screen brightness of about 65 percent. If the height of the exit surface was reduced to 0.62 of the height of the entrance surface one hundred percent of the upper half of the bundle at the screen would not get through the prism. This would result in a brightness ratio of 50 percent at the top of the viewed screen with respect to the center of the viewed screen. Accordingly, the ratio of the height of the exit surface to the entrance surface should be no less than seventy percent.

Another embodiment of the invention is shown in FIG. 4. This embodiment has been optimized so that the eyepiece groups L5–L7, and L8, L9 move in a linear ratio with field lens L2. The embodiment of FIG. 4 is substantially described by the data of Table V.

TABLE V

| Lens | | Surface Radius (mm) | Axial Distance Between Surfaces | $N_d$ | $V_d$ |
|---|---|---|---|---|---|
| L1 | R1 | 22.07 (Fresnel) | 1.50 | 1.513 | 49.1 |
| | R2 | plano | | | |
| | | | 0.50 | | |
| L2 | R3 | 40.40 | | | |
| | | | 9.04 | 1.713 | 53.9 |
| | R4 | −196.10 | | | |
| | | | 8.50 | | |
| | R5 | −116.90 | | | |
| L3 | | | 1.50 | 1.805 | 25.5 |
| | R6 | 31.63 | | | |
| | | | 4.34 | | |
| L4 | R7 | plano | | | |
| | | | 72.00 | 1.717 | 29.5 |
| | R8 | plano | | | |
| | | | 0.50 | | |
| | R9 | 44.13 | | | |
| L5 | | | 4.90 | 1.517 | 64.2 |

TABLE V-continued

| Lens | Surface Radius (mm) | Axial Distance Between Surfaces | $N_d$ | $V_d$ |
|---|---|---|---|---|
| | R10 −47.18 | | | |
| | | 0.50 | | |
| | R11 24.38 | | | |
| L6 | | 6.19 | 1.620 | 60.3 |
| | R12 −29.65 | | | |
| L7 | | 1.50 | 1.744 | 44.9 |
| | R13 112.80 | | | |
| | | 2.82 | | |
| | R14 164.04 | | | |
| L8 | | 1.50 | 1.589 | 61.3 |
| | R15 17.70 | | | |
| L9 | | 2.00 | 1.487 | 70.4 |
| | R16 18.97 | | | |

Where $N_d$ and $V_d$ are the index of refraction and the Abbe number referred to the d-line of sodium.
Clear Apertures
L1   24.36 mm
R7   17.8 × 29.0 mm
R8   14.6 × 29.0 mm
Equivalent Focal Lengths
L2   47.74 mm
L3   −30.78 mm The position of the lens groups L2; L5-L8; and L9, L10 with exit pupil position are given in Table VI.

TABLE VI

| Exit pupil to Front Of Focusing Screen (mm) | D1 (mm) | D2 (mm) | D3 (mm) | D4 (mm) | D5 (mm) |
|---|---|---|---|---|---|
| 42.0 | 0.500 | 8.500 | 0.500 | 2.818 | 2.084 |
| 55.0 | 3.000 | 6.000 | 1.497 | 2.094 | 1.811 |
| 69.0 | 5.000 | 4.000 | 2.295 | 1.514 | 1.593 |
| 90.0 | 7.000 | 2.000 | 3.093 | 0.935 | 1.374 |
| 113.0 | 8.490 | 0.510 | 3.687 | 0.503 | 1.212 |

$L_H$ = 31.40 mm
$L_V$ = 34.17 mm

Where D1 is the distance between focusing screen L1 and field lens 12,
D2 is the distance between field lens L2 and negative lens L3,
D3 is the distance between the exit surface of the prism L4 and lens L5,
D4 is the distance between lens L7 and lens L8,
D5 is the distance between lens element L9 and reference point R, as shown in FIG. 2, all distance being taken on the optical axis of the system.

It will be seen that the movement of the field lens is greater for a given distant exit pupil location, from a smaller standard exit pupil location (42.0mm, Table VI). The overall range of positioning of the field lens depends on the location of the closest exit pupil to focal plane distance of lenses adapted to be used with the camera as well as the most distant exit pupil location of a lens adapted to be used with the camera.

The invention provides a compact viewfinder system embodying movement of optical elements for lens exit pupil compensation as well as a prism of substantially reduced size while maintaining a bright field of view in the viewfinder.

By making the entrance pupil of the viewfinder coincide with the exit pupil of the objective lens essential uniform brightness of the screen is maintained.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A viewfinder system for a single lens reflex camera having a defined image frame comprising a substantially rectangular focusing screen of dimensions essentially equal to the image frame of the camera, a field lens, a pentaprism having substantially rectangular entrance and exit surfaces of essentially the same width, and reflecting surfaces therebetween, and an eyepiece disposed behind said exit surface, all on an optical axis which is changed from normally vertical to normally horizontal in said prism, a lens of negative power disposed between said field lens and said entrance surface, said entrance surface having an area substantially less than the area of said screen, said exit surface having a height of at least 0.70 of the height of said entrance surface.

2. The system of claim 1 wherein said field lens is positionable between said screen and said negative lens.

3. The system of claim 2 wherein the absolute value of the ratio of the equivalent focal length of said field lens to that of said negative power lens is substantially one and one-half.

4. The system of claim 1 wherein the dimension of the vertical optical axis in said prism is greater than the dimension of the horizontal optical axis in said prism.

5. The system of claim 4 wherein the ratio of the dimension of the horizontal optical axis measured from the vertical axis in said prism along said eyepiece ($L_H$) to the dimension of the optical axis measured from the front surface of said screen to the horizontal optical axis ($L_V$) is $L_H/L_V \leq 1.2$.

6. The system of claim 5 wherein
   $1.2 \geq L_H/L_V \geq 0.9$

7. A viewing system for a through-the-lens viewing reflex camera having the ability to accept a plurality of objective lenses, said viewing system comprising a focusing screen, a field lens, a prism having entrance and exit surfaces with two reflecting surfaces therebetween to change the optical axis of said system from vertical to horizontal, and an eyepiece all on an optical axis coincident with the axis of the objective lens, a lens of negative power disposed between said field lens and said entrance aperture, said entrance surface being dimensioned substantially smaller than the focusing screen, and the length of the optical axis in said prism being greater in the vertical than in the horizontal.

8. The system of claim 7 wherein said field lens is positionable between said negative power lens and said screen in accordance with the position of the exit pupil of the objective lens.

9. The system of claim 8 wherein the absolute value of the ratio of the equivalent focal lengths of said field lens to said negative power lens is approximately one and one-half.

10. The system of claim 8 wherein said eyepiece is positionable in accordance with the position of the field lens.

11. The system of claim 7 wherein the ratio of the dimension of the horizontal optical axis measured from the vertical axis in said prism along said eyepiece ($L_H$) to the dimension of the optical axis measured from the front surface of said screen to the horizontal optical axis ($L_V$) is $L_H/L_V \leqq 1.2$.

12. The system of claim 11 wherein
$$1.2 \geqq L_H/L_V \geqq 0.9$$

UNITED STATES PATENT AND TRADEMARK OFFICE
CERTIFICATE OF CORRECTION

PATENT NO. : 4,047,222
DATED : September 6, 1977
INVENTOR(S) : Jacob Moskovich et al It is certified that error appears in the above-identified patent and that said Letters Patent are hereby corrected as shown below:

Column 1, line 6, "reflux" should read --reflex--.

Column 1, line 8, "reflux" should read --reflex--.

Column 1, line 12, "reflux" should read --reflex--.

Column 5, line 15, "reflux" should read --reflex--.

Column 5, line 19, "is" should read --in--.

Column 5, line 57, "reflux" should read --reflex--.

Signed and Sealed this

Sixth Day of December 1977

[SEAL]

Attest:

RUTH C. MASON
Attesting Officer

LUTRELLE F. PARKER
Acting Commissioner of Patents and Trademarks